United States Patent [19]
Orlando

[11] 3,772,888
[45] Nov. 20, 1973

[54] HYDROSTATIC TRANSFER DRIVE
[75] Inventor: John B. Orlando, Warren, Mich.
[73] Assignee: F. Jos. Lamb Company, Warren, Mich.
[22] Filed: July 27, 1972
[21] Appl. No.: 275,785

[52] U.S. Cl............................ 60/444, 60/381, 60/391
[51] Int. Cl............................................. F16h 39/46
[58] Field of Search...................... 60/369, 381, 382, 60/391, 444, 446

[56] References Cited
UNITED STATES PATENTS
2,286,358  6/1942  Geiger .............................. 60/381 X
3,653,208  6/1970  Kubik ................................. 60/444

Primary Examiner—Edgar W. Geoghegan
Attorney—Arthur Raisch et al.

[57] ABSTRACT

A hydrostatic drive for reciprocating the transfer bar of a multi-station transfer mechanism wherein the motive power is supplied by a swashplate type pump, the control arm of which is pivoted to accelerate and decelerate the transfer bar by means of a yoke connected to the end of the control arm and adapted to be displaced by a control cylinder supplied with pressure fluid from an auxiliary pump through a four-way solenoid operated, spring centered valve. When the valve is in the centered position the yoke is spring biased toward a centered position, thus shifting the control arm of the swashplate pump to the neutral position so that the transfer bar can at any point between the ends of its stroke be stopped with a controlled rate of deceleration and again started with a controlled rate of acceleration.

18 Claims, 3 Drawing Figures

HYDROSTATIC TRANSFER DRIVE

This invention relates to a hydrostatic drive for reciprocating large masses (such as the transfer bar of a multi-station transfer mechanism used in an automated machine line) and, more particularly, to the acceleration and deceleration of such masses. The invention is of particular importance where the mass has to be stopped and then started again intermediate the ends of its stroke.

Many methods have been proposed in the past for reciprocating such large masses utilizing mechanical and also hydrostatic locomotive transfer devices. Most of the methods heretofore proposed have dealt only with the acceleration of the mass at the beginning of its designed stroke and the deceleration of the mass at the end of its stroke. However, the fact has been largely ignored that during normal use of the machine (such as a multi-station transfer mechanism) abnormal conditions sometimes arise that require the load (the transfer bar and the workpieces carried by it, for example) to be stopped at some position of the cycle other than at the beginning or at the end of its stroke. With conventional drives when this occurs very large stresses are imposed on all of the affected drive members both in starting and in stopping the machine. These large stresses result because the mass is not in the proper location in its travel to utilize or take advantage of the built-in controls which are available only at either end of the stroke.

For example, one type of drive currently in use utilizes a hydraulically powered linear motor as a prime mover and has a cam operable at each end of the transfer stroke which operates flow control valves to cause the mass to accelerate and decelerate at a predetermined acceptable rate.

Another type of drive presently used involves moving the mass mechanically through a kinematic linkage where the acceleration and deceleration are predetermined by the linkage design.

Drives of the last-two-mentioned types normally have inherently the same fault. When their abnormal operations require that the load be stopped at any place other than the ends of its stroke serious problems arise due to the excessive shock loads imposed on all of the drive members of the machine both when it is stopped and again when it is started intermediate the ends of the stroke. To overcome this problem secondary power devices have been used to start the load moving at a slower rate at a midstroke position, but this solves only half of the problem. Another extra auxiliary power device is required to stop the load without shock at a midstroke position. The disadvantages of both of the above solutions from the standpoint of economics and complexity of the apparatus are obvious.

The primary object of the present invention is to provide a new and improved hydraulically actuated drive arrangement for accelerating and decelerating in a controlled manner relatively large masses, such as the transfer bar in a multi-station transfer mechanism for an automated machine tool line, not only at either end of the stroke but at any intermediate position along the entire length of the stroke.

A further object of the present invention is to maintain the mass against a positive stop with a positive maximum force at either end of the stroke with a minimum amount of pumped hydraulic fluid, thus saving pumping energy and the resulting generation of excessive heat that must be dissipated.

Another object of the invention resides in the ability to move the large mass at a very low, relatively uniform speed anywhere along its travel by imparting to it short intervals of pump control signals in succession which vary in frequency depending upon the velocity desired.

Further objects and advantages of the present invention will be apparent from the following detailed description with reference to the accompanying drawings in which.

Figure 1:
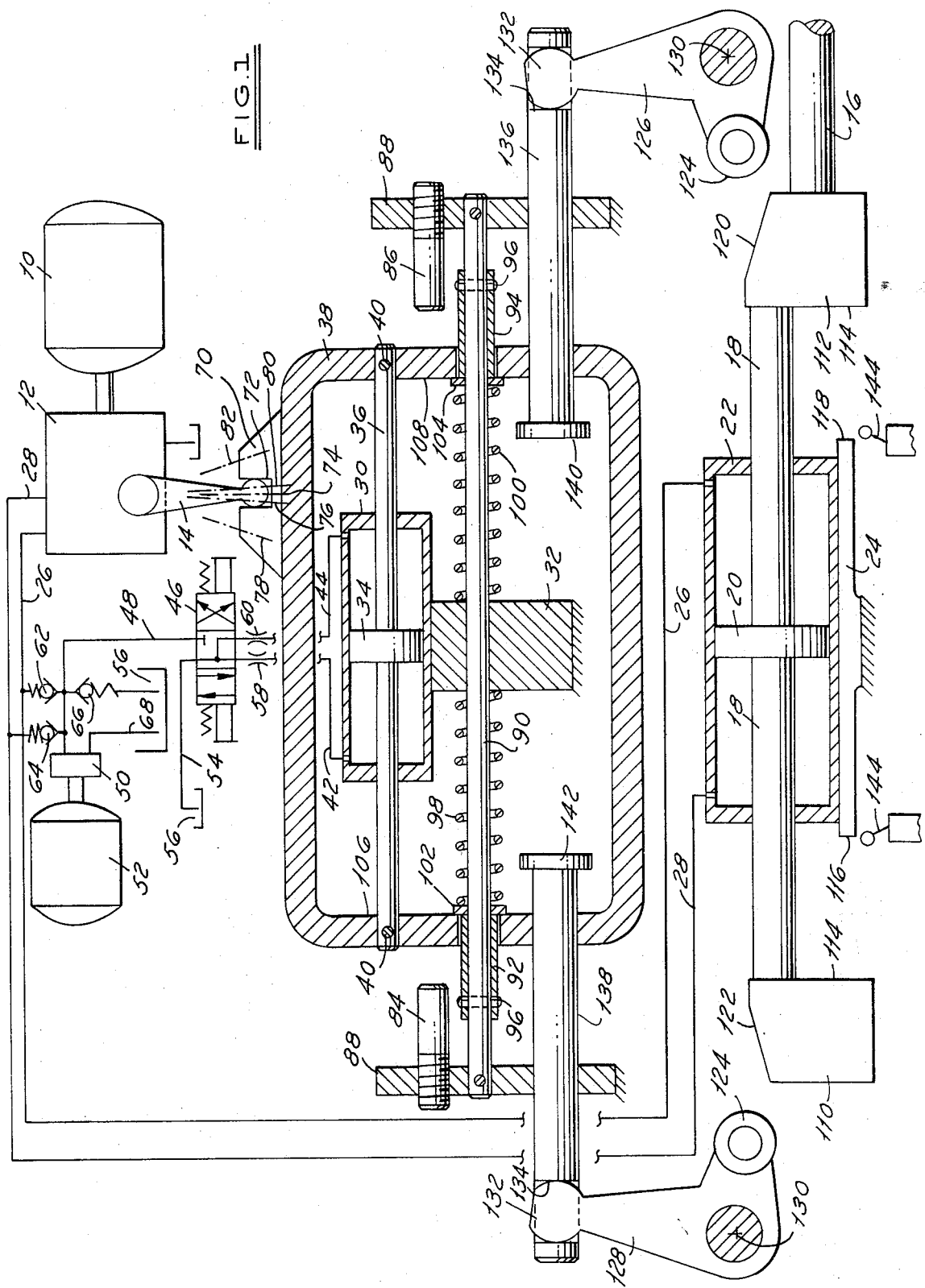
FIG. 1 is a diagrammatic view of the drive and control system of the present invention with the power cylinder for moving the load stopped in mid-stroke.

Referring to the drawings, there is illustrated at 10 a motor which drives a conventional variable displacement, axial piston pump 12 of the swashplate type. As is well understood in this art, pump 12 includes a tiltable swashplate (not shown) of the reversible type so that the volume of oil displaced by the pump and its direction of flow is controlled by the angle and direction of inclination of the swashplate. A control lever 14 is utilized for tilting the swashplate to control the volume and direction of flow of oil displaced by the pump.

The mass to be reciprocated by the drive arrangement forming the subject of this invention is shown by way of illustration as a transfer bar 16 of the type customarily employed in multi-station transfer mechanisms used in connection with an automated machine tool line. The transfer bar is reciprocated to advance a plurality of workpieces to a plurality of successive work stations where various operations are performed on the workpieces. Bar 16 is connected to a piston rod 18, the piston 20 being axially movable in a power cylinder 22. Cylinder 22 is fixedly mounted on a stationary base 24. The opposite ends of cylinder 22 are connected by conduits 26,28 with the two ports of the variable displacement pump 12.

A control cylinder 30 is fixedly mounted on a stationary support 32. Within cylinder 30 there is arranged a piston 34 fixed on a piston rod 36 projecting outwardly through opposite ends of the cylinder. A yoke 38 is fixedly connected to the opposite ends of the piston rod 36 as at 40. Thus, yoke 38 is supported by rod 36 for axial sliding movement relative to cylinder 30.

In the illustrated embodiment of the invention yoke 38 is in the form of a rectangular frame member but it will be appreciated as the description proceeds that the configuration of yoke 38 can be varied appreciably without departing from the scope of the invention.

Oil under pressure is adapted to be directed to either of the opposite ends of control cylinder 30 through conduits 42,44 which extent to a four-way solenoid operated, spring centered valve 46. The pressure port of valve 46 is connected by a conduit 48 to the outlet of a pump 50 driven by a motor 52. The tank port of valve 46 is connected by a drain line 54 with sump 56. Orifices 58,60 are provided in conduits 42,44 to control the flow of oil to and from the opposite ends of the control cylinder 30 to a substantially uniform rate. Pump 50 not only supplies the motive power to control cylinder 30 but also serves to replenish the closed loop hydrostatic drive circuit of pump 12 by means of one-way check valves 62 and 64 extending between conduit 48 and conduits 26,28, respectively. The pressure in the system is determined by the setting of a relief valve 66 connected with conduit 48 and an internal relief (not shown) in pump 12. The inlet line to pump 50 is designated 68.

Yoke 38 carries a block 70 which is slotted at 72 to receive the rounded end of control arm 14 of pump 12. Thus, as yoke 38 is shifted axially it pivots arm 14. In the position shown in FIG. 1 control arm 14 is in the neutral position designated 74 where the delivery of the pump is zero. In the following description four other positions of the control arm will be described; namely: the position designated 76 which corresponds to small forward pump delivery; position 78 which corresponds to full forward pump delivery; position 80 which corresponds to small return pump delivery; and position 82 which corresponds to full return pump delivery. Positions 78 and 82 are determined by the setting of stops 84, 86 which are adjustably mounted on fixed posts 88 on opposite sides of yoke 38.

Posts 88 are interconnected by a rod 90 which extends through fixed support 32. Two bushings 94,92 are fixedly mounted on rod 90 as by pins 96. Bushings 92,94 extend through clearance openings in yoke 38. Yoke 38 is normally biased to a centered position wherein arm 14 is in the neutral position 74 by a pair of compression springs 98,100 having their inner ends bearing against fixed support 32 and their outer ends bearing against washers 102,104 which, in the centered position of the yoke, bear against the inner opposed ends of bushings 92,94, respectively, and the inner side faces 106 and 108, respectively, of yoke 38.

At the outer ends of piston rod 18 there are fixedly mounted cam blocks 110 and 112. The inner opposed faces 114 of cam blocks 110,112 are adapted to abut against fixed stops 116,118 on base 24 at the opposite ends of the stroke of transfer bar 16. Cam blocks 110,112 are formed with cam surfaces 122,120, respectively. These cam surfaces are adapted to be engaged by cam follower rollers 124 which are journalled at the end of one arm of bell cranks 126,128. The bell cranks are supported by fixed pivots 130. The free rounded ends 132 of the other arms of the two bell cranks are engaged within the slotted portions 134 adjacent the outer ends of control rods 136,138. Control rods 136,138 are supported for axial sliding movement through yoke 38 and are enlarged at their inner ends as indicated at 140 and 142 to engage the inner side faces 108 and 106 of yoke 38 when the bell cranks are pivoted by reason of the interengagement of cam followers 124 with the cam surfaces 120,122.

In the centered position of yoke 38, as shown in FIG. 1, the enlarged ends 140,142 of control rods 136,138 are spaced inwardly of the inner faces 108 and 106 of yoke 38. However, as cam block 110 approaches stop 116 cam follower 124 of bell crank 126 engages cam surface 120 to pivot bell crank 126 in a clockwise direction and thus shift control rod 136 to the right. Likewise, on the return stroke of the transfer bar as cam block 112 approaches stop 118 cam follower 124 of bell crank 128 engages cam surface 122 to pivot bell crank 128 in a counterclockwise direction and shift control rod 138 to the left.

With the various components in the positions shown in FIG. 1 it will be understood that the solenoids of valve 46 are de-energized so that the spool of the valve is in the spring centered position. Thus, conduits 42, 44 are connected to sump 56 through orifices 58,60 and the open center of the spool. Whenever valve 46 is de-energized the imbalance between springs 98,100 returns yoke 38 to the centered position unless prevented from doing so by the interengagement of the yoke with the enlarged ends 140 and 142 of the control rods 136 and 138, respectively. In the centered position of yoke 38 control arm 14 is in the neutral position and pump 12, therefore, has a zero delivery rate. Likewise, when valve 46 is in the centered position shown in FIG. 1 the pressures in conduits 26,28 are equalized and the oil delivered by pump 50 is directed to sump 56 through relief valve 66. In the position shown in FIG. 1 transfer bar 16 is shown merely for purposes of illustration arrested at approximately the midstroke position.

Figure 2:
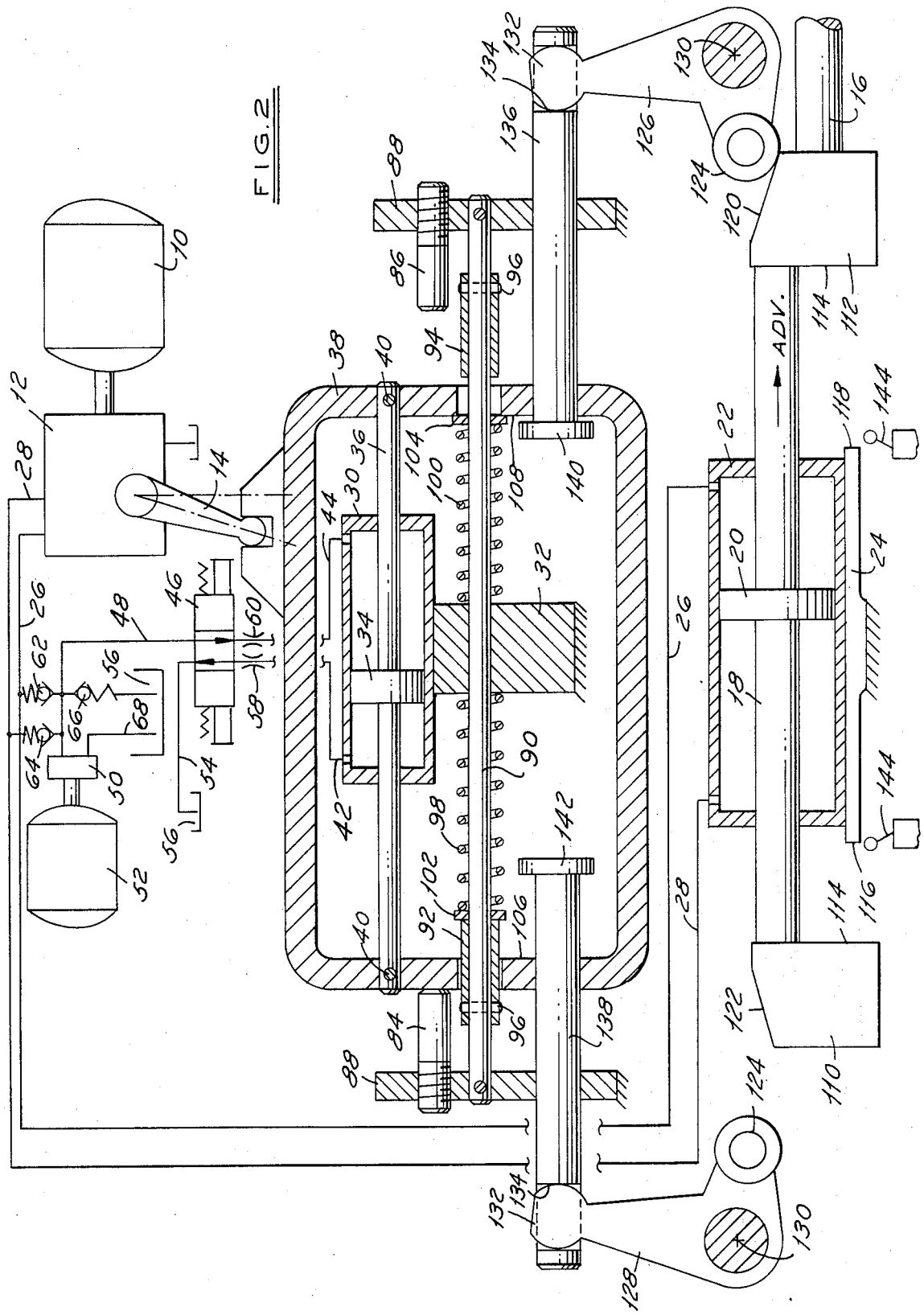
FIG. 2 is similar to FIG. 1 and shows the drive advancing at full power and full speed.

FIG. 2 shows the drive arrangement in a position moving the work load in the advance direction. To advance the transfer bar the proper solenoid of valve 46 is energized either manually or automatically from suitable electrical controls on the transfer mechanism so that the spool of valve 46 is shifted to the position shown in FIG. 2 wherein the pressurized oil from pump 50 is directed through orifice 60 and conduit 44 to the right hand end of control cylinder 30. The opposite end of cylinder 30 is connected to sump 56 through conduit 42, orifice 58 and drain line 54. This causes piston 34 to shift within control cylinder 30 in a direction towards the left at a rate determined by the sizes of orifices 58 and 60. As piston 34 shifts to the left it causes yoke 38 to likewise shift to the left which in turn produces pivotal movement of control arm 14 in a clockwise direction, thus progressively increasing the delivery of pump 12 through conduit 28 to the left hand end of power cylinder 22. Thus transfer bar 16 begins moving to the right at a smoothly increasing rate of acceleration. Orifices 58,60 are sized such that after a short interval of time, depending on the mass of the load, yoke 38 abuts stop 84 which determines the maximum displacement of arm 14 from its neutral position so that the transfer bar thereafter advances at a maximum uniform speed.

Figure 3:
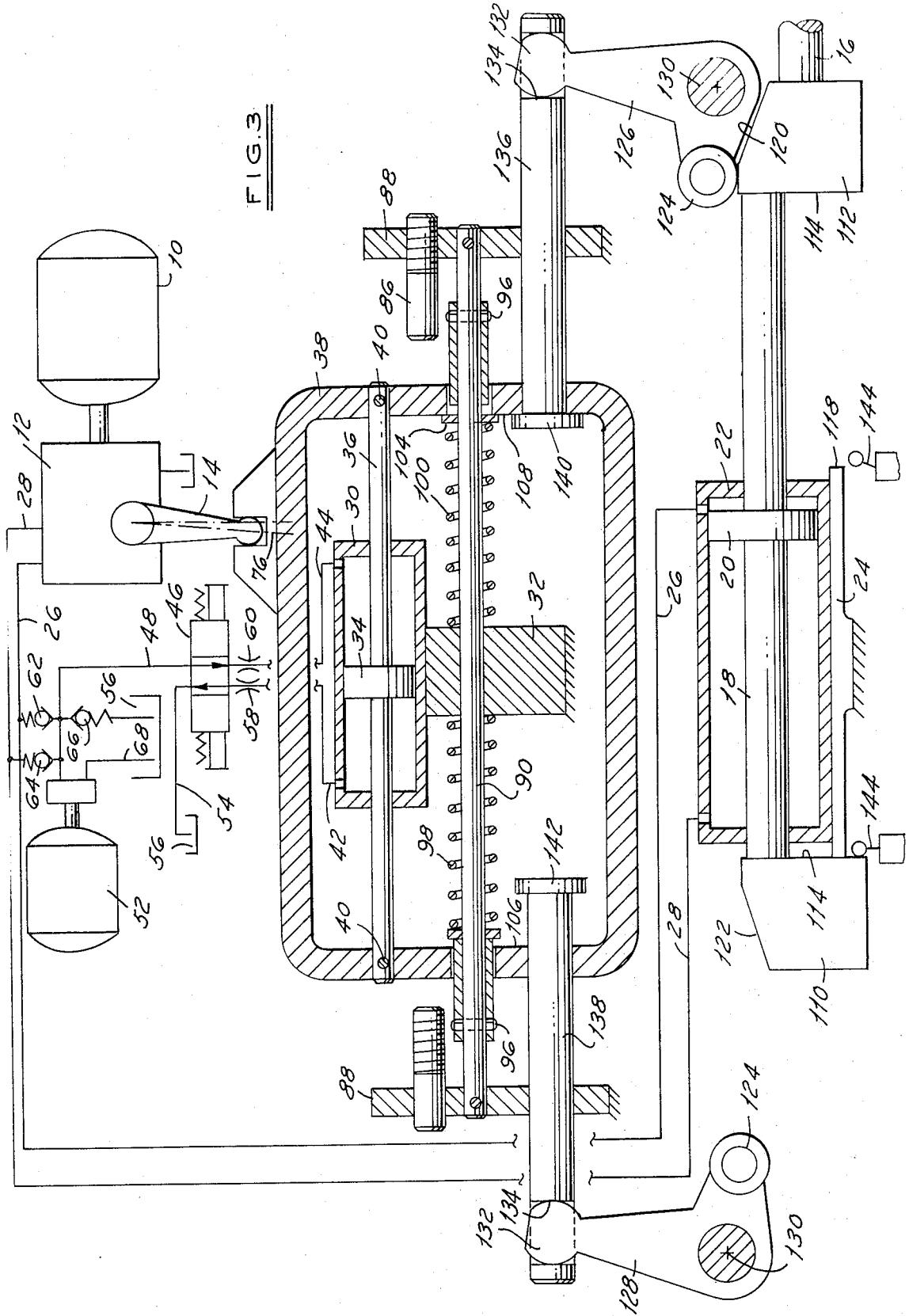
FIG. 3 is similar to FIG. 1 and shows the power cylinder fully advanced to one end of its stroke and held there under reduced power.

As the transfer bar approaches the forward end of its stroke, cam follower 124 on bell crank 126 engages cam surface 120 of cam block 112 and as the cam follower rides up the cam surface 120 it shifts control rod 136 to the right. The enlarged inner end 140 of control rod 136 abuts against the inner face 108 of yoke 38 and, accordingly, starts shifting yoke 38 to the right relative to control cylinder 30. This causes control arm 14 to pivot in a counterclockwise direction toward the position designated 76 in FIGS. 1 and 3. Thus, the displacement of pump 12 gradually diminishes to decelerate transfer bar 16 at a controlled rate. Eventually transfer bar 16 is fully advanced to the position illustrated in FIG. 3 where cam block 110 engages positive stop 116 to arrest further advancing movement of the transfer bar. In this position bell crank 126, acting through control rod 136 and yoke 38, has pivoted control arm 14 back to the position 76. When control arm 14 is in this position pump 12 is delivering a small amount of oil under pressure through conduit 28 to the left end of power cylinder 22 and, thus, the transfer bar is retained against the positive stop 116 with the maximum pressure of the system, but at a relatively low output of pump 12. Limit switches 144 are adapted to be engaged by cam blocks 110,112 at each end of the stroke and, thus, signal the electrical controls of the transfer mechanism that the stroke has been completed. This enables the necessary operations to be performed on the workpieces controlled by the transfer bar when the transfer stroke is completed.

It will be appreciated that as yoke 38 is shifted to the left as shown in FIG. 2, spring 100 will be compressed and spring 98 will remain under the same tension as it was subjected to in the centered position of the yoke. Note that washer 104 has shifted to the left relative to bushing 94 while washer 102 remains in contact with the inner end of bushing 92. However, when yoke 38 is shifted to the right by control rod 136, the tension on spring 100 is gradually decreased. Likewise, it will be appreciated that when yoke 38 assumes the position shown in FIG. 2 abutting stop 84, the oil delivered by pump 50 in excess of that required to replenish the leakage in the closed loop between pump 12 and cylinder 22 is dumped to sump through relief valve 66. Thereafter when yoke 38 is shifted to the right under the action of control rod 136 oil from the right hand end of control cylinder 30 is directed to sump through relief valve 66.

After the machining operations on the workpieces controlled by the transfer mechanism have been completed the electrical controls on the transfer mechanism transmit a signal to valve 46 to shift the spool thereof so that oil under pressure from pump 50 is directed through conduit 42 to the left end of control cylinder 30 and, thus, shift yoke 38 to the right. As soon as arm 14 pivots beyond the neutral position 74 transfer bar 16 starts to smoothly accelerate on the return stroke until yoke 38 abuts stop 86, at which point the transfer bar moves at a maximum uniform rate in the return direction. When the transfer bar approaches the end of its return stroke cam block 110 pivots bell crank 128 counterclockwise to shift yoke 38 to the left to the position wherein control arm 14 assumes position 80, in which position pump 12 is delivering a small quantity of oil to the right end of power cylinder 22 through conduit 26 to positively maintain the transfer bar in the retracted position wherein cam block 112 abuts positive stop 118.

In the course of any transfer stroke, if an emergency should arise requiring the transfer bar to be stopped intermediate the ends of its stroke, a signal is directed either manually or automatically to valve 46 to deenergize the same and shift the spool thereof to the centered position shown in FIG. 1. When this occurs the opposite ends of control cylinder 30 are connected to sump 56 through orifices 58,60. Thus, spring 98 or spring 100 (as the case may be) will return yoke 38 to the centered position at a rate determined by the flow permitted through orifices 58,60 and control arm 14 will be pivoted back to the neutral position 74. Although the flow rate is restricted by orifices 58,60, control arm 14 will be shifted to the neutral position at a rate sufficiently fast to be adequate for an emergency stop. Thereafter when the condition requiring the emergency stop has been corrected an electrical signal will be directed either manually or automatically to valve 46 so that the transfer bar will resume its advance or return stroke. Thus, oil under pressure will be directed to one end or the other of control cylinder 30 so as to pivot control arm 14 in the proper direction and at a smooth rate of speed controlled by the flow permitted at orifices 58,60 so that the mass of the load will again be moved at a predetermined smoothly accelerated rate.

If a slow rate of travel of the transfer bar is required for the set-up of the machine, for trouble shooting or for some other reason, a short increment of shift of valve 46 may be introduced by the operator through an electrical jog button which will move control arm 14 a small amount and, therefore, produce a small output of pump 12. Due to the slow recovery of arm 14 to the neutral position, a series of short valve shiftings will keep the transfer bar moving at a slow even rate.

As is generally understood in this art, the volumetric output of a swashplate type pump is a function of the sine of the angle of the swashplate to which the control arm 14 is connected. At the same time the relationship between the travel of yoke 38 and control arm 14 is also a function of the sine of this angle. Therefore, for all practical purposes, it can be stated that the volumetric output of pump 12 is directly related to the rate of travel of yoke 38. This results in a uniform acceleration of transfer bar 16 until it reaches its maximum speed. The contours of cam surfaces 120,122 can be modified as required to generate any deceleration curve desired. Likewise, the positions 78 and 82 of control arm 14 can be adjusted by stops 84 and 86 to control the maximum velocity of the transfer bar in either direction.

I claim:

1. Means for reciprocating a load through a predetermined stroke at a predetermined rate of acceleration wherein movement of the load is adapted to be interrupted intermediate the ends of the stroke and then resumed at said predetermined rate of acceleration comprising, a hydraulic motor connected to the load to reciprocate the same, a variable displacement motor driven pump connected with the hydraulic motor for moving the load at a rate determined by the volumetric output of the pump, a control member movable to vary the displacement of the pump, said control member being movable from a neutral position where the delivery of the pump is substantially zero toward a second position where the delivery of the pump is at a maximum value, a second hydraulic motor for moving the control member, a second motor driven pump for operating the second hydraulic motor at a predetermined rate whereby to move the control member from said neutral position toward said second position to produce said predetermined rate of acceleration of the load, valve means operable to disconnect the second pump from the second hydraulic motor and biasing means operable when the valve means disconnect the second pump from the second hydraulic motor to shift the control member back to said neutral position whereby when said valve means are disconnected at a point in the cycle where the load is intermediate the ends of its stroke and the valve means are then operated to reconnect the second pump with the second hydraulic motor movement of the load is resumed at said predetermined rate of acceleration.

2. The combination called for in claim 1 wherein said second hydraulic motor has an inlet port and an exhaust port, said valve means being adapted to connect said inlet and exhaust ports to sump when operated to disconnect the second pump from the second hydraulic motor and flow control means interposed between said sump and said inlet and exhaust ports for controlling the rate of flow from said ports to sump when said valve means disconnects the second pump from the second hydraulic motor whereby to cause said biasing means to shift said control member toward said neutral position at a predetermined rate and thereby decelerate the load at a predetermined rate.

3. The combination called for in claim 2 wherein said valve means are interposed between the second pump adn the second hydraulic motor and the flow control means are interposed between the valve means and the second hydraulic motor.

4. The combination called for in claim 2 including means operable adjacent each end of the stroke of the load for moving the control member at a predetermined rate toward said neutral position independently of said biasing means whereby to decelerate the load at a predetermined rate as it approaches the opposite ends of its stroke.

5. Means for reciprocating a load through a predetermined stroke at a predetermined controlled rate and wherein movement of the load is adapted to be interrupted intermediate the ends of the stroke at a controlled rate of deceleration and then resumed at a controlled acceleration rate comprising, a reversible hydraulic motor connected to the load to reciprocate the same, a variable displacement motor driven pump connected with the motor for reciprocating the load at a rate determined by the volumertric output of the pump, a control member movable to vary the displacement of the pump, a second hydraulic motor for moving the control member, means including a second motor driven pump for operating the second hydraulic motor at a uniform rate to thereby move the control member at a predetermined rate to vary the output of the first pump at a predetermined rate from a predetermined low value to a predetermined high value to thereby control the acceleration rate of the load, means biasing said control member to neutral position wherein the first pump has a zero output and valve means selectively operable to disconnect the second pump from the second hydraulic motor for permitting the biasing means to shift the control member to said neutral position at a predetermined rate to thereby control the rate of deceleration of the load.

6. The combination called for in claim 5 including means operable adjacent opposite ends of the stroke of the load and connected to said control member for moving the same at a predetermined rate toward said neutral position independently of said biasing means to thereby decelerate the load at a predetermined rate adjacent the opposite ends of its stroke.

7. The combination called for in claim 6 wherein said last-mentioned means includes a cam and cam follower, said cam being contoured for establishing the rate at which the control member is moved toward said neutral position as the load approaches the end of its stroke.

8. The combination called for in claim 5 wherein said second hydraulic motor comprises a piston-cylinder arrangement and said valve means are operable to connect opposite ends of the cylinder to sump when it is desired to interrupt the movement of the load intermediate the ends of its stroke.

9. The combination called for in claim 8 wherein said valve means are interposed between the second pump and said cylinder and including additional means interposed between said valve means and said cylinder for controlling the flow rate from the second pump to the cylinder and from the cylinder to sump to a predetermined substantially uniform value.

10. The combination called for in claim 9 wherein said biasing means are adapted to shift the piston relative to the cylinder at a rate determined by said flow control means.

11. The combination called for in claim 5 wherein said first hydraulic motor comprises a piston-cylinder assembly, said variable displacement pump having a pair of ports connected one to each end of said cylinder, said control member being shiftable from said neutral position in opposite directions to selectively establish either of the ports as the outlet or the inlet of the variable displacement pump.

12. The combination called for in claim 11 wherein the second hydraulic motor comprises a piston-cylinder assembly mechanically connected to said control member and adapted to shift the control member in opposite directions from said neutral position to direct pressure fluid from the variable displacement pump to either end of the load displacing cylinder.

13. The combination called for in claim 12 wherein said biasing means comprises a pair of opposed springs acting on said control member such that, when the control member is displaced in either direction from said neutral position, one of said springs exerts a biasing force thereon tending to return the control member to said neutral position, said second pump being capable of overcoming the bias of said springs when said valve means interconnects the second pump with the cylinder controlling movement of the control member.

14. The combination called for in claim 13 including a pair of adjustable stops for limiting movement of the control member in opposite directions from said neutral position.

15. The combination called for in claim 5 wherein said control member comprises a pivotably supported arm, said control member also comprising a yoke connected to said arm and adapted to be reciprocated by said second hydraulic motor to pivot said arm.

16. The combination called for in claim 15 wherein said first-mentioned hydraulic motor comprises a piston-cylinder assembly and including a pair of opposed cams adapted to reciprocate with said load, a pair of opposed members each having a lost motion connection with said yoke, a cam follower associated with each of said last-mentioned members and adapted to be engaged by each of said cams when the load approaches either end of its stroke to establish a driving connection between its respective member and said yoke to shift the control member toward said neutral position.

17. The combination called for in claim 16 wherein the cams are contoured to produce a predetermined rate of displacement of the control member to thereby determine the rate of deceleration of the load as it approaches each end of its stroke.

18. The combination called for in claim 16 wherein said load is adapted to engage positive stops at each end of its stroke and said members move said yoke to a position short of the neutral position of said control member when the load is positioned against said stop so that the load is retained against said stop under the force exerted by said first hydraulic motor under low output from the first pump.

* * * * *